United States Patent Office 3,287,411
Patented Nov. 22, 1966

3,287,411
PROCESS OF MAKING ALIPHATIC AMINES
Reginald L. Wakeman, Philadelphia, Pa., and Frederick H. Low, New York, N.Y., assignors, by mesne assignments, to Millmaster Onyx Corporation, New York, N.Y., a corporation of New York
No Drawing. Filed Sept. 5, 1963, Ser. No. 306,701
4 Claims. (Cl. 260—585)

The present invention relates to a process for the preparation of aliphatic amines from monochlorinated aliphatic hydrocarbons possessing a linear saturated carbon chain containing from 10 to 34 carbon atoms and having the chlorine radical attached to the penultimate carbon atom. It is a further object of this invention to provide a method for obtaining primary, secondary, or tertiary amines by reaction of ammonia, a primary amine, or a secondary amine, respectively, with such monochlorinated hydrocarbons derived from an alpha olefin by addition of hydrogen chloride across the double bond. The preferred process of this invention is a method of making aliphatic tertiary amines having the structure

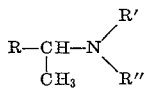

where R is a straight chain alkyl radical having from 8 to 32 carbon atoms and R' and R" are lower aliphatic radicals containing from 1 to 4 carbon atoms, preferably methyl groups, by reaction of the addition product of an alpha olefin and hydrogen chloride with a lower secondary amine, preferably dimethyl amine.

Alpha olefins are currently commercially available chemical raw materials which are produced either by cracking essentially straight chain paraffinic hydrocarbons or by a Ziegler type synthesis by polymerization of ethylene. It is an object of the present invention to provide a means for converting hydrocarbons of this nature which contain from 10 to 34 carbon atoms to primary, secondary, or tertiary amines.

It is well known to the art to prepare amines by reaction of a higher normal primary aliphatic chloride with ammonia or with a primary or secondary amine. It has, however, been commonly supposed that aliphatic monochlorides containing the chlorine atom attached to a secondary carbon atom would not react with an amine.

We have, however, now found that monochlorinated saturated aliphatic hydrocarbons having a straight chain containing from 10 to 34 carbon atoms and having the chlorine attached to carbon atom number 2 can be reacted, under somewhat more drastic conditions than those heretofore employed for normal primary chlorides, with ammonia or primary amines or secondary amines to give good yields of the corresponding alkyl amines in which the amino radical is attached to the second carbon atom of the long carbon chain.

The monochlorinated hydrocarbons containing a chlorine attached to carbon atom number 2 used in the process of this invention may be prepared by any convenient method. We may, for example, convert a 2-hydroxy alkane to the chloride by reaction with hydrogen chloride, thionyl chloride, or other reagent known to the art for converting alcohols to chlorides. We prefer, however, to prepare the chloride by direct addition of hydrogen chloride across the double bond of an alpha olefin. The method of carrying out this reaction is known to those skilled in the art and may be effected, for example, by reaction of the alpha olefin with hydrogen chloride, preferably in the presence of a catalyst such, for example, as certain Lewis acids. A typical method for preparing such monochlorides is illustrated in Examples 1 through 5 below.

Example 1

Anhydrous hydrogen chloride from a cylinder was slowly bubbled into a flask provided with an outlet protected by a calcium chloride drying tube and containing 226 gms. of dodecene-1 to which 226 mgms. of anhydrous ferric chloride was added. The dodecene-1 was heated to a temperature of 150–160° C. and the hydrogen chloride gas was introduced slowly during a two-hour period to permit nearly complete absorption. At the end of this time, the reaction product was cooled to room temperature, washed first with 5% sodium bicarbonate solution and then several times with water, dried over anhydrous sodium sulfate and analyzed for chlorine. The desired product, pure 2-chlorodecane, should have a chlorine content of 17.3%. The reaction product was found to contain 71.5% of the theoretical amount of 2-chlorododecane.

Example 2

In a manner similar to that of Example 1, 1205 gms. of dodecene-1 containing 2.2 gms. of anhydrous ferric chloride was hydrochlorinated at 150–160° C. during a period of three hours to yield a product containing 80.5% of theory of 2-chlorododecane.

Example 3

In a manner similar to that of Example 1, 2836 gms. of dodecene-1 containing 425 mgms. of anhydrous ferric chloride was hydrochlorinated during a period of eight hours at a temperature of 95° C. to yield a product containing 95% of the theoretical amount of 2-chlorododecane.

The color of the reaction product was a light brownish yellow as contrasted with dark brown for the products of Examples 1 and 2.

In general, it was found that hydrochlorination proceeded at an impracticably slow rate at temperatures below 50° C. Under suitable catalytic conditions, lower temperatures, however, may be employed, if desired. As a rule, the lower the temperature of hydrochlorination, the lighter the color of the product will be. The hydrochlorination temperature should not exceed the decomposition point of the olefin and is preferably below its boiling point at atmospheric pressure.

Example 4

In a manner similar to that of Example 1, 641.5 gms. of hexadecene-1 containing 600 mgms. of anhydrous ferric chloride was hydrochlorinated at 155° C. over a period of six hours. The resultant product containing 79.5% of the theoretical amount of 2-chlorohexadecane.

Example 5

In a manner similar to that of Example 1, 2945 gms. of hexadecene-1 containing 610 mgms. of anhydrous ferric chloride was hydrochlorinated at 95° C. during a period of eight hours to yield a product containing 95.5% of the theoretical amount of 2-chlorohexadecane.

In a manner similar to that shown in the preceding examples, 2-chlorodecane, 2-chlorotetradecane, 2-chlorooctadecane, 2-chloroeicosane, 2-chlorotetratriacontane and the like may be prepared from the corresponding alpha olefins. It is, of course, equally possible to prepare 2-chloroparaffinic hydrocarbons from alpha olefins containing an odd number of carbon atoms such as undecene-1 tridecene-1, pentadecene-1, heptadecene-1 and the like. These olefins may occur, for example, in the products of cracked wax.

In carrying out the process of this invention, a 2-chloro straight chain hydrocarbon of the type hereinabove described is reacted under pressure with ammonia, a primary amine, or a secondary amine to obtain the corresponding alkyl amines of primary, secondary, or tertiary nature, respectively, using temperatures between 125° C. and 250° C., preferably in the presence of water or a hydroxyl-bearing organic solvent such as methanol, ethanol, isopropanol, ethylene glycol, or propylene glycol. At temperatures below about 150° C., however, the reaction is usually so sluggish that the yields within a reasonable length of time are too low for commercial practicability. The invention is illustrated by the following examples.

*Example 6*

300 gms. of the product of Example 2 containing 1.17 moles of 2-chlorododecane was dissolved in 665 gms. of 99% isopropanol containing 158.2 gms. of dimethyl amine introduced therein from a gas cylinder. The reaction mixture was contained in a high pressure stirring stainless steel autoclave and heated at 170° C. for seven hours, the pressure being about 250 lbs. per sq. in. At the end of this time, the solvent was removed by stripping under vacuum and the product acidified with dilute hydrochloric acid. Unreacted material, including unreacted dodecene-1 present in the original hydrochlorination product, was extracted with heptane. After separation of the aqueous phase, the latter was made alkaline by addition of excess 30% sodium hydroxide solution and the tertiary amine thus liberated was extracted with heptane. The heptane solution of the tertiary amine was dried over anhydrous sodium sulfate, filtered, and distilled to remove the solvent and purify the tertiary amine. 174 gms. of crude 2-dimethyl amino dodecane, of 85% activity by titration, or 58% of theory, was obtained as a light yellow liquid.

*Example 7*

The same reaction conditions were used in this example as in Example 6 except that 64 gms. of sodium carbonate (0.6 mole) was added to facilitate reaction. At 170° C., the pressure developed was 275 lbs. per sq. in. After six hours of reaction, the product was worked up as before, giving 173 gms. (65.5% of theory) of crude tertiary amine which, upon vacuum distillation, gave 143 gms. of a water-white product, 2-dimethyl amino dodecane, which distilled at 170–185° C. under 70 mm. vacuum and titrated for 100% activity.

*Example 8*

Another preparation was carried out in the manner of Example 6, but using a lower ratio of dimethyl amine to 2-chlorododecane. Amounts of reaction mixture were 326 gms. of the product of Example 3, 81 gms. of dimethyl amine, and 339 gms. of isopropanol. After reaction for six hours at 170° C. and 260 lbs. per sq. in. pressure and working up the reaction product as described in Example 6, 196 gms. of 2-dimethyl amino dodecane was obtained boiling at 174–187° C. at 74 mm.

Instead of using 2-chlorododecane in this example, an equimolar amount of 2-chlorodecane, 2-chlorotetradecane, 2-chlorooctadecane, 2-chloroeicosane, and 2-chlorotriacontane prepared as in Example 5 may be employed.

*Example 9*

515 gms. of 2-chlorohexadecane (95.5% active, product of Example 5) was reacted as in Example 6 with 81 gms. of dimethyl amine in 339 gms. of isopropanol, in the presence of 159 gms. of sodium carbonate. Reaction was carried out for four and one-half hours at 170° C. (230 lbs. per sq. in. maximum pressure). 280 gms. of crude product, 61.6% active by analysis, was obtained. Upon distillation at about 220–230° C. at 98 mm., 160 gms. of 2-dimethyl amino hexadecane was obtained as a water-white product, corresponding to a yield of 44% of the theoretical.

Instead of dimethyl amine, diethyl amine can be used in equimolar amounts in any of Examples 6 through 9.

*Example 10*

326 gms. of 95% 2-chlorododecane of Example 3 was reacted as in Example 6, using 420 gms. of a 19.25% solution of dimethyl amine in isopropanol in the presence of 159 gms. of sodium carbonate. Reaction was carried out for six hours at 125–130° C. At the end of this time, 106 gms. of 89% active 2-dimethyl amino dodecane was obtained, corresponding to 29% of theory.

The primary, secondary and tertiary amines prepared by the method of this invention are useful components of corrosion inhibitors in amounts of from 1 to 10%. They may be employed in the form of their hydrochlorides or acetates as ore flotation agents. The secondary amines of this invention are useful intermediates for the preparation of amphoteric surface-active agents. They may, for example, be reacted with chloro acetic acid, propane sultone, or 1-chlor-2-hydroxy propane-3-sodium sulfonate to give surface-active materials containing both a cationic and anionic group. The tertiary amines of this invention may be reacted with benzyl chloride or with alkylated benzyl chlorides containing from 1 to 4 carbon atoms attached to the benzyl ring or with dichlor benzyl chloride in order to obtain useful quaternary ammonium germicides. They may be reacted with chloro acetic acid in order to form betaines having amphoteric surface-active properties. They may also be converted by reaction with hydrogen peroxide or with Caro's acid to yield tertiary amine oxides which can be employed with or without other surfactants such as alkyl benzene sulfonates, as components of detergent blends, shampoos and the like.

We claim:
1. The method of making an aliphatic amine from a monochlorinated aliphatic linear saturated hydrocarbon containing 10 to 34 carbon atoms and having the chlorine radical attached to carbon atom number 2 which comprises the step of reacting said monochlorinated hydrocarbon with a base selected from the group consisting of ammonia, a primary amine and a secondary amine at a temperature between 125 and 250° C., acidifying the reaction product, extracting the unreacted material from the reaction mixture, adding a base to make the mixture alkaline and to liberate the free amine formed in the reaction, and extracting the free amine from the mixture.

2. The method of making an aliphatic amine as defined in claim 1, wherein the reaction is carried out in the presence of water.

3. The method of making an aliphatic amine as defined in claim 1, wherein the reaction is carried out in the presence of an organic hydroxyl-bearing solvent selected from the group consisting of lower aliphatic alcohols and glycols.

4. The method of making an aliphatic amine as defined in claim 1, wherein the monochlorinated hydrocarbon is selected from the group consisting of 2-chlorodecane, 2-chlorododecane, 2-chlorotetradecane, 2-chlorohexadecane, 2-chlorooctadecane, 2-chloroeicosane, and 2-chlorotetratriacontane.

References Cited by the Examiner
UNITED STATES PATENTS 2,006,058    6/1935    Olin _____ 260—585
2,172,822    9/1939    Tamele et al. _____ 260—585 XR CHARLES B. PARKER, *Primary Examiner.*

JOSEPH P. BRUST, *Examiner.*

A. H. SUTTO, R. L. RAYMOND, *Assistant Examiners.*